United States Patent [19]

Sikorski et al.

[11] Patent Number: 5,075,166
[45] Date of Patent: Dec. 24, 1991

[54] COMPOSITE COMPRISING A RESIN PREPREG AND A PROTECTIVE SHEET CONTAINING FERROMAGNETIC MATERIAL AND WHICH IS ADHERED TO THE RESIN PREPREG BY MAGNETIC FORCES

[75] Inventors: Siegfried Sikorski; Michael Schober; Reinhold Schoenacher, all of Munich, Fed. Rep. of Germany

[73] Assignee: MTU Motoren-Und Turbinen-Union-Munchen GmbH, Munich, Fed. Rep. of Germany

[21] Appl. No.: 487,741

[22] Filed: Mar. 1, 1990

[30] Foreign Application Priority Data

Mar. 10, 1989 [DE] Fed. Rep. of Germany ....... 3907757

[51] Int. Cl.⁵ .............................................. B32B 27/00

[52] U.S. Cl. .................................... 428/332; 428/337; 428/411.1; 428/694; 428/343; 428/900; 428/221; 427/47; 425/3; 425/DIG. 33

[58] Field of Search ............ 427/47; 425/3, DIG. 33; 428/242, 900, 223, 343, 694, 332, 337, 411.1

[56] References Cited

U.S. PATENT DOCUMENTS

| | | | |
|---|---|---|---|
| 3,607,569 | 9/1971 | Greenwell | 156/500 |
| 3,668,752 | 6/1972 | Clifton et al. | 29/124 |
| 4,515,850 | 5/1985 | Ishino et al. | 428/225 |
| 4,882,089 | 11/1989 | Iwaskow et al. | 428/242 |

Primary Examiner—Merrell C. Cashion, Jr.
Assistant Examiner—Stevan A. Resan
Attorney, Agent, or Firm—Ladas & Parry

[57] ABSTRACT

A protective sheet for a resin pre-impregnated fiber board (prepreg) incorporates ferromagnetic material. This permits effective and safe manipulation of the fiber board during processing (trimming) and in the manufacture of fiber components.

18 Claims, 1 Drawing Sheet

COMPOSITE COMPRISING A RESIN PREPREG AND A PROTECTIVE SHEET CONTAINING FERROMAGNETIC MATERIAL AND WHICH IS ADHERED TO THE RESIN PREPREG BY MAGNETIC FORCES

FIELD OF THE INVENTION

This invention relates to a protective sheet for resin prepregs and to a method of manufacture utilizing the prepregs and the protective sheet.

BACKGROUND

Prepregs are resin preimpregnated mats, fabrics or layers composed of unidirectional elementary fibers. For manufacturing fiber components from prepregs, the latter are spread on a mold and the prepregs are caused to adhere to one another by means of heat and pressure. For components of complex geometries the prepregs are trimmed to size before spreading them on the mold.

To protect the prepregs from contamination and damage when they are worked on with trimming tools, the prepregs which can be made of carbon, glass or aramid fiber are provided with protective sheets on both surfaces thereof. When being trimmed to size, the prepregs are held, together with the protective sheets, by mechanical fixing means such as clamps or they are secured on a smooth table by means of negative pressure (suction), where a vacuum is created under the prepreg with its protective sheet. For this purpose, the table is provided with holes or consists of plastic brushes in a very dense arrangement to prevent the necessary suction pressure from being diminished by leakage flows.

The trimming tools are operated automatically or manually, and can be constructed as knives, laser cutters, high-pressure water jets or ultrasonic cutters. In the cutting operation, the prepreg may be cut together with only one of the two protective sheets, with the individual blanked-out prepregs remaining together, or both sheets are cut to produce separate, individual precut parts.

The known procedure for fixing the prepregs in position either requires relatively elaborate mechanical fixing means on the processing tool, or else comprehensive vacuum devices, the latter additionally being susceptible to contamination, where the suction holes may be blocked or the plastic brush seals closed off. Also, the hold-down force diminishes when the prepregs lift off the support, no matter how little.

SUMMARY OF THE INVENTION

In a broad aspect of the present invention, a protective sheet of the above type is fixedly positioned in a simple manner for processing (trimming) on the cutter, for transport to the component to be manufactured, and for the manufacture of the component.

It is a particular object of the present invention to make the protective sheet ferromagnetic. This advantageously permits fixing the protective sheet on the prepreg by magnetic forces. This provides an advantage over the vacuum-type fixing means in that contamination, for example, by dust from cutting, is prevented. Stepping or linear type electric motors can be used to transport the prepregs after trimming, or robots can be used to pick up and redeposit the prepregs.

Another substantial advantage is that magnetization of the protective sheet also helps to improve manufacture of the fiber components. A magnetic field in the interior of the mold can be used, for example, to position the prepregs on the mold such that their position can be shifted and, thus, corrected.

A further substantial advantage provided by the protective sheet of the invention is that it can be designed to carry electronic information, like a magnetic tape or a computer floppy disk, such as numbers for correlation with the fiber board. In this manner, automatic production of a fiber component is substantially assisted and simplified.

In a preferred aspect of the present invention, the protective sheet consists of a nonmagnetic, flexible substrate joined to a ferromagnetic layer. This advantageously provides adequate protection of the prepreg from mechanical action. The substrate preferably consists of paper or plastic, while the ferromagnetic layer is preferably formed by metallic gauze, a metallic sheet or powdered metal. In a preferred aspect of the present invention, the ferromagnetic layer is in the form of metallic gauze embedded in the substrate.

In a particularly simple manner of manufacture, the ferromagnetic layer is deposited on the substrate by vapor deposition, spraying or electroplating.

In a further advantageous aspect of the present invention, the prepreg is covered with the ferromagnetic protective sheet on one side only, while on the other side a conventional sheet is provided which merely serves a protective function. This reduces costs with the functionability approximately remaining unchanged.

A suitable material for the ferromagnetic layer is iron, nickel, cobalt or alloys thereof exhibiting ferromagnetic properties. The ferromagnetic layer is applied in a thickness of preferably 1/1000 mm to 1 mm. With powdered metal layers the thickness can be about 0.01 mm to 0.02 mm, while with metal gauze or similar flexible layers, the layers will have greater thickness.

In a further advantageous aspect of the present invention, the powdered metal ferromagnetic layer is provided between two substrate layers to prevent metal powder particles from separating from the protective sheet.

A preferred method for manufacturing components by laminating resin prepregs is to cover the prepregs on at least one side with a ferromagnetic protective sheet. In the interior of the mold, means are provided for generating a magnetic field, and with the magnetic field activated a prepreg to be applied is positioned on the mold with the protective sheet on the outside. After aligning the prepreg, its temperature is raised, for example, by an infrared emitter such that the resin turns tacky and adheres to the mold or to a previously deposited laminate under a specified contact pressure. The magnetic sheet can be peeled off and the next layer deposited either before or after the contact pressure is applied.

For the purpose, the magnetic field in the interior of the mold can be deactivated by electromagnets.

The magnetic sheet of the present invention is suited especially well for peeling by automatic means in the form, for example, of magnetic or magnetizable rollers.

A further substantial advantage provided by the present invention is that state-of-the-art protective sheeting for prepregs can be modified by subsequent application of the inventive ferromagnetic layer by electroplating, vapor deposition, spraying or rolling to achieve the abovementioned advantages and advantageous effects.

DETAILED DESCRIPTION OF PREFERRED EMBODIMENTS

Figure 1:
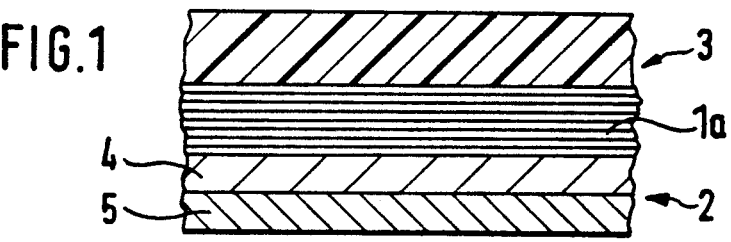
FIG. 1 is a schematic sectional view illustrating a portion of a prepreg with a protective sheet according to the invention.

With reference now to FIG. 1 a prepreg 1a is covered on both sides with protective sheets 2 and 3. In this arrangement the protective sheet 2 consists of a flexible non-magnetic substrate 4 adhering to the prepreg 1a and a ferromagnetic layer 5 bonded to the substrate 4. The substrate 4 can be made of paper or plastic and can have a thickness of 0.01 to 0.15 mm. The ferromagnetic layer 5 can be a layer of metallic gauze, a metallic sheet or a layer of powdered metal. The thickness of the layer 5 can be between 0.01 and 1 mm. The ferromagnetic material in layer 5 can be iron, nickel, cobalt and alloys thereof having ferromagnetic properties.

The protective sheet 3 applied to the other side of the prepreg 1a consists of a combined substrate and ferromagnetic layer obtained by embedding ferromagnetic elements, such as in the form of a fabric, in the substrate. In this arrangement the two different protective sheets 2, 3 are shown for illustrative purposes. In practical applications, it will be preferable to provide the same type of protective sheet on both sides of the prepreg.

Figure 2:
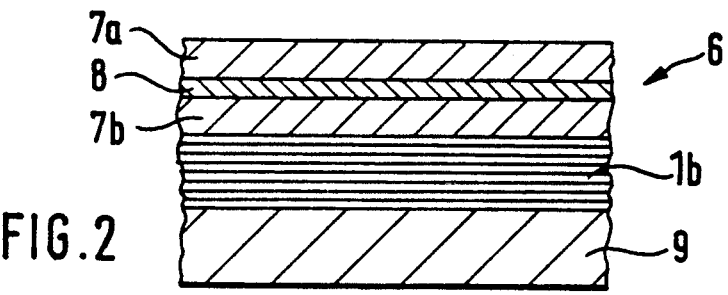
FIG. 2 is a schematic sectional view illustrating another prepreg with a modified embodiment of the protective sheet.

Applied to one side of the prepreg 1b illustrated in FIG. 2 is a protective sheet 6 consisting of two substrates 7a, 7b with an intervening ferromagnetic layer 8 therebetween in the form, for example, of powdered metal. The other side of the prepreg 1b is provided with a conventional nonmagnetic protective sheet 9.

In the above embodiments, the ferromagnetic layer can be applied to the substrate by vapor deposition, spraying, rolling or electroplating.

Figure 3:
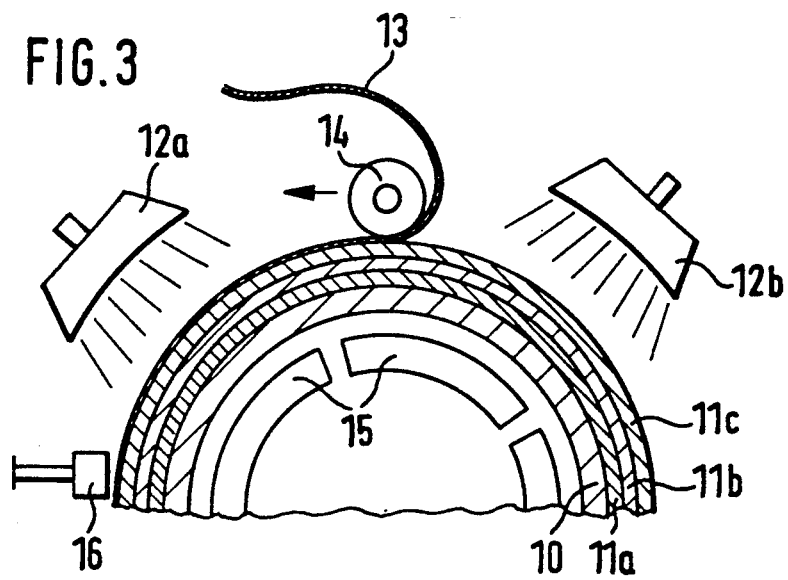
FIG. 3 is a schematic sectional view of a mold covered with prepregs illustrating the method of the invention associated with ferromagnetic protective sheets on the prepregs.

Illustrated in FIG. 3 is a preferred use of the protective sheet of the present invention. Illustrated in FIG. 3 is a mold 10 to which are applied several prepreg layers 11a,b,c. The prepreg layers have been made to conform to the mold under pressure and heat. Heat is applied by infrared emitters 12a,b. The outermost prepreg layer 11c is provided on its outer surface with a ferromagnetic protective sheet 13, which is peeled off by means of a magnetizable roller 14. In the interior of the mold 10 a plurality of deenergizible magnets 15 are provided. An electromagnetic read/write means 16 is provided to read information stored on the protective sheet 14 and accordingly control the processing or positioning of the prepreg 11c. As the roller 14 rolls on the surface of the uppermost prepreg layer in the direction of the arrow, the protective layer 13 is progressively removed from the prepreg layer. When the protective layer 13 is completely removed, the next prepreg layer can be placed on the layers on the mold.

Although the invention has been described with reference to specific embodiments thereof it will become apparent to those skilled in the art that numerous modifications and variations can be made within the scope and spirit of the invention as defined in the attached claims.

What is claimed is:

1. A prepreg composite comprising a resin prepreg of non-magnetic material and a protective sheet on said resin prepreg of non-magnetic material, said protective sheet comprising a layer of material and ferromagnetic material in said layer, said protective sheet being removably adhered to said resin prepreg and being removable from said resin prepreg by utilization of the ferromagnetic material in said protective sheet.

2. A composite sheet as claimed in claim 1 where said layer comprises a nonmagnetic, flexible substrate on said prepreg and said ferromagnetic material is in the form of a ferromagnetic layer joined to said substrate.

3. A composite sheet as claimed in claim 2 wherein said ferromagnetic layer is embedded in said substrate.

4. A composite sheet as claimed in claim 2 wherein said ferromagnetic layer and said substrate are bonded to each other.

5. A composite sheet as claimed in claim 2 wherein said ferromagnetic layer is joined to said substrate by vapor deposition, spraying, rolling or electroplating.

6. A composite sheet as claimed in claim 2 wherein said substrate consists of paper or plastic material.

7. A composite sheet as claimed in claim 2 wherein ferromagnetic layer comprises a metallic gauze.

8. A composite sheet as claimed in claim 2 wherein said ferromagnetic layer comprises powdered metal.

9. A composite sheet as claimed in claim 7 comprising a second substrate, said ferromagnetic layer being between the two substrates.

10. A composite sheet as claimed in claim 8 comprising a second substrate, said ferromagnetic layer being between the two substrates.

11. A composite sheet as claimed in claim 2 wherein said ferromagnetic layer comprises a metal sheet.

12. A composite sheet as claimed in claim 2 wherein said substrate has a thickness of approximately 0.01 to 0.15 mm.

13. A composite sheet as claimed in claim 12 wherein said ferromagnetic layer has a thickness of approximately 0.01 to 1 mm.

14. A composite sheet as claimed in claim 2 wherein said ferromagnetic layer is made of iron, nickel, cobalt or alloys thereof.

15. A composite as claimed in claim 2 comprising a second protective sheet, said protective sheets covering the prepreg on both sides thereof.

16. A composite as claimed in claim 1, said protective sheet covering the prepreg on one side thereof and a non-magnetic protective sheet covering the other side of the prepreg.

17. A composite sheet as claimed in claim 2 wherein said ferromagnetic layer includes a portion in which information can be stored by electromagnetic write/read means.

18. A composite as claimed in claim 1 wherein said non-magnetic material of said resin prepreg is carbon, glass or aramid fiber.

* * * * *